United States Patent
Hann et al.

(10) Patent No.: US 6,914,901 B1
(45) Date of Patent: Jul. 5, 2005

(54) SYSTEM AND METHOD FOR COMMUNICATING USING MULTIPLE MEMORY BANKS

(75) Inventors: William P. Hann, Round Rock, TX (US); Gerald S. Stellenberg, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 10/008,724

(22) Filed: Dec. 5, 2001

(51) Int. Cl.$^7$ ............................................. H04L 12/50
(52) U.S. Cl. ................ 370/366; 370/395.1; 370/395.4; 370/428; 710/71
(58) Field of Search ................................ 370/428, 429, 370/395.1, 396, 398, 389, 412, 360, 366, 395.4, 401, 413; 710/62, 65, 71, 126, 129, 131

(56) References Cited

U.S. PATENT DOCUMENTS

| | | | |
|---|---|---|---|
| 5,323,399 A | * 6/1994 | Kurano | 370/398 |
| 5,390,184 A | * 2/1995 | Morris | 370/353 |
| 5,475,679 A | * 12/1995 | Munter | 370/395.4 |
| 5,583,894 A | * 12/1996 | Linsley | 375/372 |
| 5,664,116 A | * 9/1997 | Gaytan et al. | 709/234 |
| 5,892,764 A | * 4/1999 | Riemann et al. | 370/401 |
| 5,917,805 A | 6/1999 | Manning et al. | 370/236 |
| 5,948,067 A | 9/1999 | Caldara et al. | 709/236 |
| 5,978,359 A | 11/1999 | Caldara et al. | 370/236 |
| 5,978,370 A | 11/1999 | Shively | 370/370 |
| 5,982,771 A | 11/1999 | Caldara et al. | 370/389 |
| 5,982,776 A | 11/1999 | Manning et al. | 370/414 |
| 5,983,260 A | 11/1999 | Hauser et al. | 709/201 |
| 5,991,298 A | 11/1999 | Hunt et al. | 370/390 |
| 5,996,019 A | 11/1999 | Hauser et al. | 709/235 |
| 6,002,667 A | 12/1999 | Manning et al. | 370/232 |
| 6,021,128 A | 2/2000 | Hosoya et al. | 370/380 |
| 6,031,821 A | 2/2000 | Kalkunte et al. | 370/235 |
| 6,055,235 A | 4/2000 | Blanc et al. | 370/389 |
| 6,076,112 A | 6/2000 | Hauser | 709/234 |
| 6,094,430 A | * 7/2000 | Hoogenboom | 370/375 |
| 6,215,788 B1 | * 4/2001 | Sakurai et al. | 370/391 |
| 6,295,299 B1 | * 9/2001 | Haddock et al. | 370/423 |
| 6,430,191 B1 | * 8/2002 | Klausmeier et al. | 370/412 |
| 6,529,523 B1 | * 3/2003 | Kato | 370/466 |
| 2003/0165147 A1 | * 9/2003 | Shimada | 370/412 |

* cited by examiner

*Primary Examiner*—Alpus H. Hsu
*Assistant Examiner*—Clemence Han
(74) *Attorney, Agent, or Firm*—Baker Botts L.L.P.

(57) ABSTRACT

A method for communicating data is provided that includes communicating a first set of data from a first channel to a first serial-to-parallel converter and communicating a second set of data from a second channel to a second serial-to-parallel converter, the data sets are then converted to a parallel format. The converters are monitored to determine when one or more words of the respective data sets have accumulated in each of the converters. One or more of the words that have accumulated in each of the converters are then written to a selected one of first and second memory banks. A single scheduler monitors the memory banks to determine when the words that were written to each of the memory banks have formed one or more cells such that they may be read out of a selected one of the memory banks to be communicated to an output communications link.

25 Claims, 2 Drawing Sheets

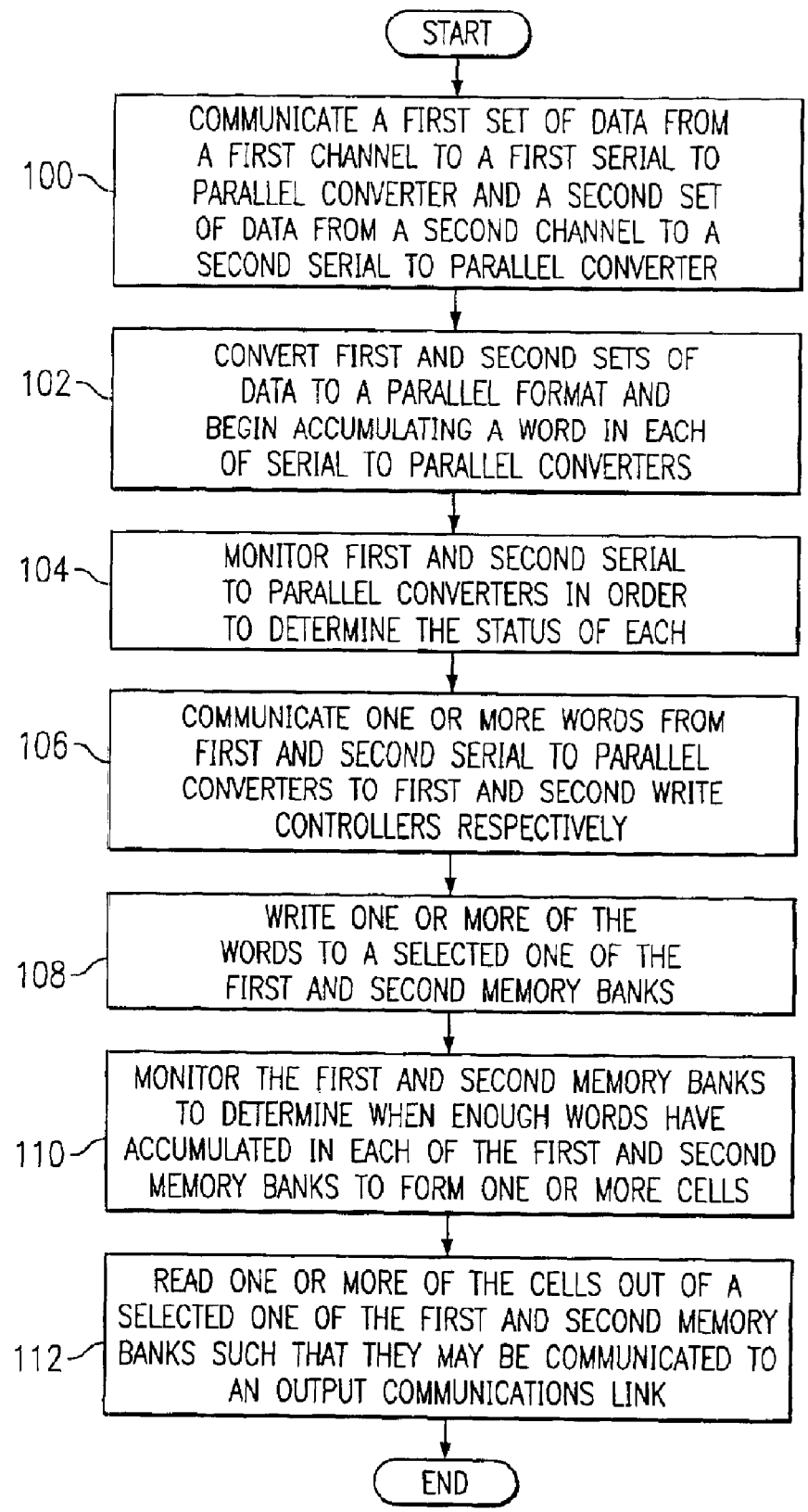

SYSTEM AND METHOD FOR COMMUNICATING USING MULTIPLE MEMORY BANKS

TECHNICAL FIELD OF THE INVENTION

This invention relates in general to communications, and more particularly to a system and method for communicating using multiple memory banks.

BACKGROUND OF THE INVENTION

Communications has become increasingly important in today's society. One aspect of communications relates to the use of memory within components or devices that operates to buffer or otherwise store data that it receives. One element associated with the use of memory in communications is the storage space allocated for each line or channel of input data. The use of a large block of memory for each line or channel of input data may provide satisfactory capacity or suitable bandwidth, but such 1a memory block may be lethargic with respect to speed and cumbersome in imposing space restrictions on an associated communications device or component. The lack of a memory device that provides a suitable data exchange with the requisite bandwidth may also unduly restrain or otherwise inhibit effective communications within an associated device.

SUMMARY OF THE INVENTION

According to one embodiment of the present invention a method for communicating data is provided that includes communicating a first set of data from a first channel to a first serial-to-parallel converter and communicating a second set of data from a second channel to a second serial-to-parallel converter, the data sets are then converted to a parallel format. The first and second serial-to-parallel converters are then monitored in order to determine when one or more words of the respective data sets have accumulated in each of the first and second serial-to-parallel converters. One or more of the words that have accumulated in each of the first and second serial-to-parallel converters are then written to a selected one of first and second memory banks. A single scheduler monitors the first and second memory banks to determine when enough of the words that were written to each of the first and second memory banks have formed one or more cells. One or more of the cells are then read out of a selected one of the first and second memory banks such that they may be communicated to an output communications link.

Certain embodiments of the present invention provide a number of technical advantages. For example, according to one embodiment of the present invention a memory may be divided into multiple memory banks that operate to optimize storage and processing capabilities. Because channels of input data may share a memory block that is segmented into several memory banks, the requisite spatial allocations of an associated device or component are significantly reduced. The sharing of memory blocks not only provides a significant reduction in memory blocks needed, it may also eliminate additional corresponding circuitry and/or components.

Another technical advantage of one embodiment of the present invention is a result of a scheduler that optimizes the communication of data that is read out of multiple memory banks. The scheduler selects a cell that is ready to be communicated out of a selected memory bank and communicates that cell to a next destination, such as an ATM switch, for example. This optimization results in improved speed in communications to and from an associated device because the sharing of a single memory block, which often creates a delay associated with data to be communicated out of the device, is effectively eliminated.

Embodiments of the present invention, which follow, may enjoy some, all, or none of these advantages. Other technical advantages are readily apparent to one skilled in the art from the following figures, the description, and the claims.

BRIEF DESCRIPTION OF THE DRAWINGS

Reference is made to the following description taken in conjunction with the accompanying drawings in which:

FIG. 3 is a flow chart illustrating a series of example steps associated with the communications system of FIG. 1 in accordance with one embodiment of the present invention.

DETAILED DESCRIPTION OF EXAMPLE EMBODIMENTS OF THE INVENTION

Figure 1:
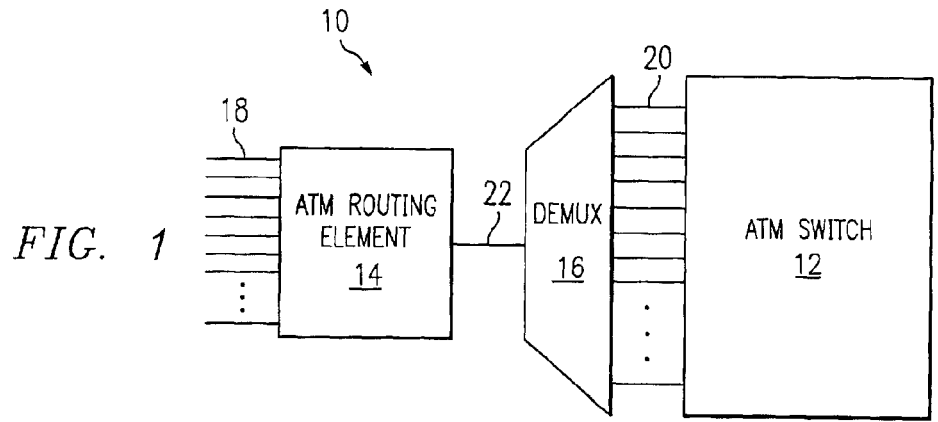
FIG. 1 is a block diagram of a communications system in accordance with one embodiment of the present invention.
Figure 2:
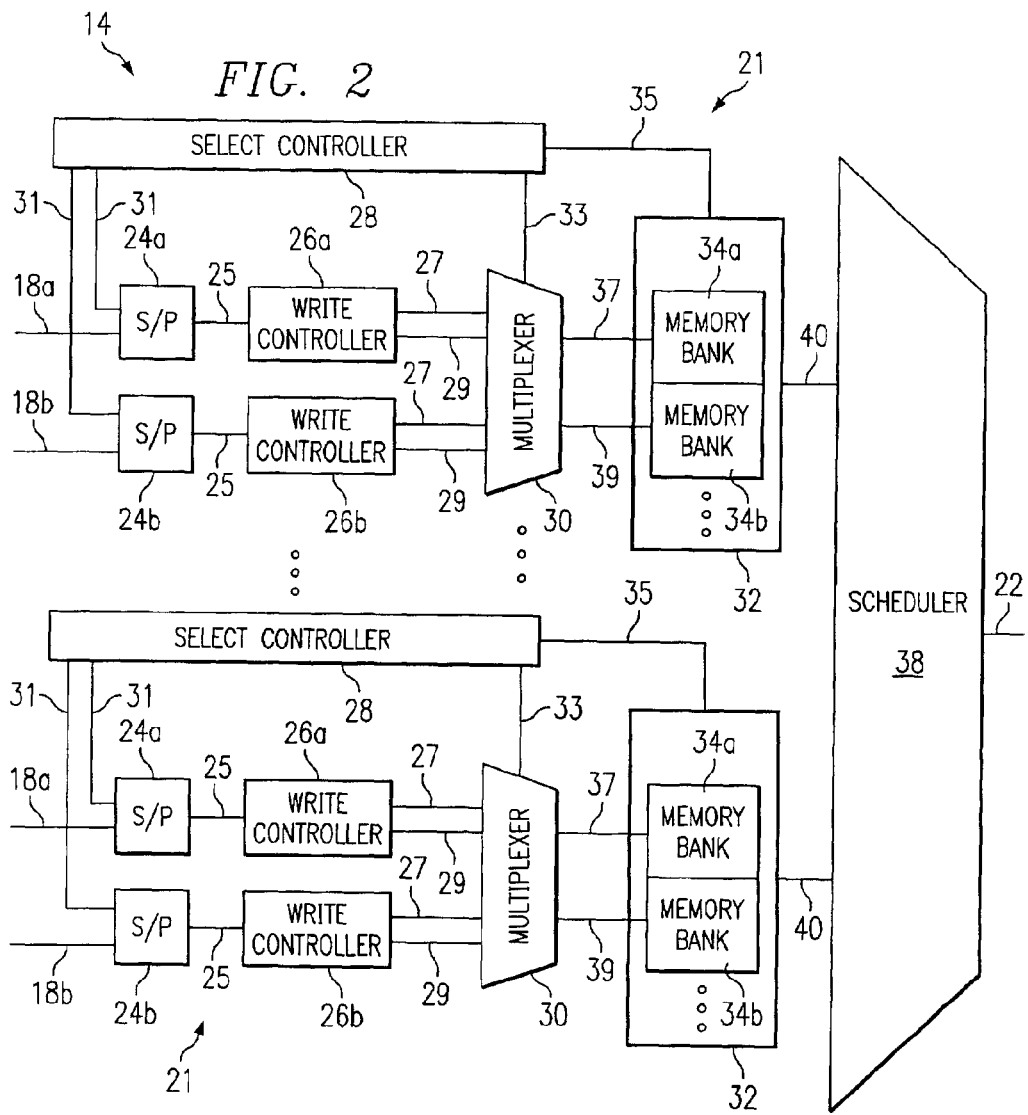
FIG. 2 is a block diagram illustrating additional details of an asynchronous transfer mode (ATM) routing element within the communications system of FIG. 1 in accordance with one embodiment of the present invention.

Example embodiments of the invention are best understood by referring to FIGS. 1 through 3 of the drawings in which like numerals refer to like parts.

FIG. 1 is a block diagram of a communications system 10 in accordance with one embodiment of the present invention. Communications system 10 includes an asynchronous transfer mode (ATM) switch 12, an ATM routing element 14, and a demultiplexer 16. A series of input channels 18 are coupled to ATM routing element 14 and provide a data pathway for information flowing to ATM routing element 14. Data as used herein in this document refers to any type of numeric, voice, script, or other suitable information that may be communicated. In a particular embodiment of the present invention, ATM routing element 14 receives sixty-four serial input channels 18, each channel carrying information or data in a packetized form, such as transmission control protocol/internet protocol (TCP/IP), for example. Alternatively, ATM routing element 14 may receive any suitable number of input channels 18 according to particular needs. Demultiplexer 16 receives information from ATM routing element 14 through a communications link 22. Demultiplexer 16 performs an inverse multiplexing function in receiving information or data from a single communications link 22 and converting the information into a parallel format to be communicated to ATM switch 12 via a set of multiple communications links 20.

ATM routing element 14 comprises a memory that is segmented into a plurality of memory banks (described in greater detail below with reference to FIG. 2). ATM routing element 14 may receive data from one or more input channels 18 in a serial format, for example, to be written into a selected one of the memory banks. Data is written into a respective memory bank once a portion of data has accumulated or otherwise built-up from input channels 18. In this fashion, memory banks within ATM routing element 14 may be written to in an alternating manner based on the status of information being accumulated in ATM routing element 14. ATM routing element 14 is included within a field programmable gate array (FPGA) according to the teachings of one embodiment of the present invention; however, ATM routing element 14 could alternatively be included in an ATM switch, a router, or any other communications device or component that provides an interface between input channels 18 and communications link 22.

Turning to FIG. 2, FIG. 2 is a block diagram illustrating additional details of ATM routing element 14 within communications system 10 of FIG. 1 in accordance with one embodiment of the present invention. ATM routing element 14 comprises a plurality of data switching units 21 for receiving data packets from input channels 18 and a scheduler 38 for coordinating the reading of data from switching units 21.

Each data switching unit 21 receives information or data through a set of input channels 18a and 18b. Each data switching unit 21 comprises, in this embodiment, a pair of serial-to-parallel converters 24a and 24b, a pair of write controllers 26a and 26b, a select controller 28, a multiplexer 30, and a memory block 32 that comprises a pair of memory banks 34a and 34b. A pair of output communications links 40 couple each respective memory 32 to scheduler 38. According to the teachings of the present invention, data switching units 21 cooperate with scheduler 38 to provide alternating reading and writing functions to communications system 10 such that both memory banks 34a and 34b can provide optimal bandwidth, increased space allocation, and enhanced speed for an associated device.

The alternation of reading and writing functions allows multiple input channels 18a and 18b to utilize multiple memory banks 34a and 34b for communication, which results in optimal speed in data that propagates through communications system 10. This also provides the benefit of increased bandwidth as data may be written to either memory bank 34a or 34b once the data has accumulated to a designated value, such as a 16-bit word, for example.

In addition to the enhanced speed associated with the writing of data to a given memory bank 34a or 34b, the speed in which data is read out of either of memory banks 34a or 34b may also be increased. Data may be read out of either memory banks 34a or 34b once a cell of information has formed (a cell representing approximately 26 words or 53 bytes of data). This allows cells of data to be read out of a either memory bank 34a or 34b with minimal delay, i.e. immediately after reaching a given threshold or status.

Serial-to-parallel converters 24a and 24b receive data from input channels 18a and 18b, respectively. The data received may be in packet form such as transmission control protocol/internet protocol (TCP/IP), for example; however, the data may be transmitted according to any other suitable protocol according to particular needs. Serial-to-parallel converters 24a and 24b convert the data that they receive from input channels 18a and 18b from a serial format to a parallel format, e.g. a 16-bit word. Although illustrated as a pair, serial-to-parallel converters 24a and 24b may be a single unit or any number of units, pairs, or other suitable combinations where appropriate. Additionally, these units may be cascaded or otherwise replicated or modified according to particular needs.

Serial-to-parallel converters 24a and 24b may each include a buffering element or component that stores packets of information or data until a designated amount of information, such as a 16-bit word, has accumulated. In cases where the data propagation through input channels 18a and 18b is in a parallel format, serial-to-parallel converters 24a and 24b may be eliminated entirely. In such a case, a buffering element or component may be provided within or external to write controllers 26a and 26b in order to store data or information until a designated quantity of information is ready to be communicated to multiplexer 30. Serial-to-parallel converters 24a and 24b are coupled to write controllers 26a and 26b respectively and are each also coupled to select controller 28.

Write controllers 26a and 26b receive words in a parallel format from serial-to-parallel converters 24a and 24b through a communications link 25. Write controllers 26a and 26b write data that they receive to respective memory banks 34a and 34b. Although illustrated in FIG. 2 as a pair, write controllers 26a and 26b may be any number of units where appropriate. In one embodiment, write controllers 26a and 26b each generate a memory address for each of the words they receive. The memory address designates the space in memory banks 34a and 34b in which the words are written. Accordingly, write controllers 26a and 26b provide information on an address line 27 and a data line 29 to be communicated to multiplexer 30. After a piece of data, such as a word for example, is subsequently written into one of memory banks 34a and 34b, the memory address to which the word was written in a portion of memory banks 34a or 34b is incremented in the associated write controller 26a or 26b such that the next piece of information that is written into memory banks 34a or 34b is communicated to a next location in the respective memory bank. Thus, the steps of incrementing the address and writing to a selected memory bank 34a or 34b is repeated continuously as data is being written into memory banks 34a and 34b.

Select controller 28 monitors serial-to-parallel converters 24a and 24b using communications link 31 and determines when a portion of data, such as a 16-bit word for example, is ready to be communicated to one of write controllers 26a and 26b respectively to be written to one of memory banks 34a and 34b, via multiplexer 30. Select controller 28 also provides a control signal to multiplexer 30 via a communications link 33. The control signal carried by communications link 33 instructs multiplexer 30 to pass data to memory bank 34a or memory bank 34b, discussed in greater detail below. Select controller 28 also provides a write enable signal to memory block 32 through a communications link 35. The write enable signal notifies a selected memory bank 34a or 34b that data is forthcoming and will accordingly be written thereto; this is discussed in greater detail below. Select controller 28 comprises software operable to execute the monitoring, address generating, and signaling functions as described above. Alternatively, select controller 28 may comprise hardware, or any other element or component operable to perform these functionalities. Select controller 28 is also coupled to multiplexer 30 through communications link 33.

Multiplexer 30 may be any suitable multiplexing device, software, hardware or component operable to convert a series of input channels into a lesser number of output communication channels. Multiplexer 30 receives one or more words from write controllers 26a and 26b via communication link 29 and memory addressing information via communication link 27. Multiplexer 30 combines this information (i.e. multiplexes the data) such that a single flow of information (inclusive of the memory address information and the data) is provided to output to communications links 37 and 39 to memory banks 34a and 34b respectively. Multiplexer 30 also receives a control signal from select controller 28 indicating which of memory banks 34a and 34b data is to be communicated to using communications links 37 and 39. The multiplexed data is written into a selected one of memory banks 34a and 34b.

According to one embodiment of the present invention, memory block 32 is a dual-port random access memory (RAM) that has been segmented into two memory banks 34a and 34b. For purposes of teaching the present invention, each of memory banks 34a and 34b are described as holding four cells, one cell being roughly equal to 53 bytes or 26 words. Alternatively, memory block 32 and memory banks 34a and 34b may be any storage medium (such as a first in first out (FIFO) structure for example) operable to receive data from multiplexer 30 or any component that delivers data or information from an associated serial or parallel channel. Each memory bank 34a and 34b is provided for each input channel 18a and 18b that carries data.

The use of several segmented memory banks 34a and 34b, as opposed to a single dual-port memory element, reduces the size of an associated communications device or component. This is due to the need to have a dedicated memory bank for each input channel of information. According to the teachings of the present invention, a single segmented memory may be provided to facilitate communications received from multiple channels, instead of using several single dual-port memory elements for multiple channels. This may be particularly beneficial where spatial or design considerations require certain component restraints or specifications that include sizing restrictions. Although illustrated in FIG. 2 as a pair, memory banks 34a and 34b may be any number of units or sections where appropriate or otherwise may be partitioned according to particular needs. Each of memory banks 34a and 34b are coupled to scheduler 38 via a communications link 40.

Scheduler 38 includes software, in one embodiment, operable to read a cell of data out of a selected memory bank 34a or 34b associated with any of data switching units 21. Alternatively, scheduler 38 may include any hardware, component or element operable to read information out of memory banks 34a and 34b. In addition, scheduler 38 may include an interface that converts a cell of data into a proper protocol for suitable communications out of scheduler 38 via communications link 22. Scheduler 38 may additionally comprise a controller that operates to selectively read portions of data out of memory banks 34a and 34b. Accordingly, scheduler 38 may include suitable elements that generate appropriate read address information and read control signals. Scheduler 38 may also include suitable handshaking elements that provide an interface between ATM routing element 14 and an additional component or device.

Turning to FIG. 3, FIG. 3 is a flow chart illustrating a series of example steps associated with communications system 10 of FIG. 1 in accordance with one embodiment of the present invention. The method begins at a first step 100, where a first set of data is communicated from a first channel to serial-to-parallel converter 24a and a second set of data is communicated from a second channel to serial-to-parallel converter 24b. At step 102, the first and second sets of data are converted into a parallel format by serial-to-parallel converters 24a and 24b. At step 104, select controller 28 monitors both serial-to-parallel converters 24a and 24b to determine the accumulated presence of one or more words in each of serial-to-parallel converters 24a and 24b.

At a next step, 106, select controller 28 instructs a selected one of serial-to-parallel converters 24a and 24b to communicate one or more words to write controllers 26a and 26b. Write controllers 0.26a and 26b then generate a memory address for the data words received and pass the memory address and data to multiplexer 30. Once each of the words are written into memory banks 34a or 34b, the memory address generated by write controllers 26a and 26b is incremented such that the next word that is received by write controllers 26a or 26b may be written into the next location of memory banks 34a or 34b. These steps are repeated continuously, i.e. increment an address, write to a memory block, increment an address, etc.

Multiplexer 30 receives the data and memory address information and a control signal from select controller 28, which designates that memory bank 34a or 34b is to be written to. The control signal strobes multiplexer 30 such that data is written to the specified portion of memory banks 34a or 34b at step 108. At step 110, memory banks 34a and 34b are monitored by scheduler 38 to determine when enough words have been accumulated to equal, a cell of data. Scheduler 38 may then read one or more cells out of memory banks 34a or 34b at step 112. Scheduler 38 may thus selectively read cells out of each of memory banks 34a and 34b, as they reach a status point when cells are ready to be communicated. Scheduler 38 may then pass this information on to a Utopia bus, for example, to be communicated out of ATM routing element 14. After exiting ATM routing element 14, the cells may be demultiplexed or otherwise processed before being sent to ATM switch 12 via output communications links 20.

Although several embodiments have been illustrated and described in detail, it will be understood that various substitutions and alterations can be made therein without departing from the present invention. For example, although FIGS. 1 and 2 illustrate data being communicated to memory via a serial channel, this data could; be parallel or in any other appropriate format and thus manipulated or otherwise processed accordingly without departing from the scope of the present invention.

Additionally, although scheduler 38 is illustrated as a single component, scheduler 38 may be a series of components, hardware, software, or elements that are operable to effect the functions of scheduler 38 as described above. Also, the present invention contemplates that a large number of memories and associated devices may be included within communications system 10 for purposes of communicating data such that the use of available memory is optimized. Additionally, although the present invention is described in the context of an ATM environment, the present invention contemplates that any communications system could benefit from the teachings of the present invention, such as: a frame relay communication system, Ethernet switches, DSLAM applications, or other various TCP/IP communications, for example. In addition, the present invention may be used in the aggregation of multiple modem channels in an ATM environment.

Numerous other changes, substitutions, variations, alterations, and modifications may be suggested to one skilled in the art, and it is intended that the present invention encompass all such changes, substitutions, variations, alterations, and modifications as following within the spirit and scope of the appended claims.

What is claimed is:

1. A method for communicating data, comprising:
    communicating a first set of data from a first channel to a first serial-to-parallel converter and communicating a second set of data from a second channel to a second serial-to-parallel converter;
    converting the first and second sets of data to a parallel format;
    monitoring the first and second serial-to-parallel converters in order to determine when one or more words of the respective data sets have accumulated in each of the first and second serial-to-parallel converters;

writing one or more of the words that have accumulated in each of the first and second serial-to-parallel converters to a selected one of first and second memory banks;

monitoring, by a single scheduler, the first and second memory banks to determine when enough of the words that were written to each of the first and second memory banks have formed one or more cells; and reading one or more of the cells out of a selected one of the first and second memory banks such that they may be communicated to an output communications link.

2. The method of claim 1, further comprising generating a memory address for each of the one or more words to be written into the first and second memory banks, the memory addresses designating the space where the one or more words are written to in the first and second memory banks.

3. The method of claim 2, further comprising receiving one or more of the cells that are read out of the first and second memory banks at an ATM switch.

4. The method of claim 1, wherein the reading of the cells out of the first and second memory banks is executed by a scheduler that is coupled to the first and second memory banks and a Utopia bus.

5. The method of claim 1, further comprising providing a select controller, which is coupled to the first and second serial-to-parallel converters, the select controller being operable to determine which of the first and second memory banks the words, which have accumulated in each of the first and second serial-to-parallel converters, are written to.

6. The method of claim 5, further comprising communicating a write enable signal from the select controller to a selected one of the first and second memory banks to indicate that one or more of the words, which have accumulated in each of the first and second serial-to-parallel converters, is ready to be written.

7. The method of claim 6, further comprising signaling, by the select controller, to a multiplexer to communicate one or more of the words, which have accumulated in each of the first and second serial-to-parallel converters, to a selected one of the first and second memory banks.

8. The method of claim 1, further comprising incrementing an address associated with a selected one of the first and second memory banks each time one of the words, which have accumulated in each of the first and second serial-to-parallel converters, is written to one of the first and second memory banks.

9. A system for communicating data, comprising:

means for communicating a first set of data from a first channel to a first serial-to-parallel converter and communicating a second set of data from a second channel to a second serial-to-parallel converter;

means for converting the first and second sets of data to a parallel format;

means for monitoring the first and second serial-to-parallel converters in order to determine when one or more words of the respective data sets have accumulated in each of the first and second serial-to-parallel converters;

means for writing one or more of the words that have accumulated in each of the first and second serial-to-parallel converters to a selected one of first and second memory banks;

means for monitoring, by a single scheduler, the first and second memory banks to determine when enough words have accumulated in the first and second memory banks to form one or more cells; and means for reading one or more of the cells out of the first and second memory banks such that they may be communicated to an output communications link.

10. The system of claim 9, further comprising means for generating a memory address for each of the one or more words to be written into the first and second memory banks, the memory addresses designating the space where the one or more words are written to in the first and second memory banks.

11. The system of claim 10, further comprising means for receiving one or more of the cells that are read out of the first and second memory banks at an ATM switch.

12. The system of claim 11, wherein the reading of the cells out of the first and second memory banks is executed by a scheduler that is coupled to the first and second memory banks and a Utopia bus.

13. The system of claim 9, further comprising means for determining which of the first and second memory banks the words, which have accumulated in each of the first and second serial-to-parallel converters, are written to.

14. The system of claim 13, further comprising means for communicating a write enable signal to a selected one of the first and second memory banks to indicate that one or more of the words, which have accumulated in each of the first and second serial-to-parallel converters, is ready to be written.

15. The system of claim 14, further comprising means for signaling to a multiplexer to communicate one or more of the words, which have accumulated in each of the first and second serial-to-parallel converters, to a selected one of the first and second memory banks.

16. The system of claim 9, further comprising incrementing an address associated with a selected one of the first and second memory banks each time one of the words, which have accumulated in each of the first and second serial-to-parallel converters, is written to one of the first and second memory banks.

17. Software for communicating data embodied in a computer readable medium and operable to:

communicate a first set of data from a first channel to a first serial-to-parallel converter and communicating a second set of data from a second channel to a second serial-to-parallel converter;

convert the first and second sets of data to a parallel format;

monitor the first and second serial-to-parallel converters in order to determine when one or more words of the respective data sets have accumulated in each of the first and second serial-to-parallel converters;

write one or more of the words that have accumulated in each of the first and second serial-to-parallel converters to a selected one of first and second memory banks;

monitor, by a single scheduler, the first and second memory banks to determine when enough words have accumulated in the first and second memory banks to form one or more cells; and read one or more of the cells out of the first and second memory banks such that they may be communicated to an output communications link.

18. The software of claim 17, further operable to generate a memory address for each of the one or more words to be written into the first and second memory banks, the memory addresses designating the space where the one or more words are written to in the first and second memory banks.

19. The software of claim 18, further operable to receive one or more of the cells that are read out of the first and second memory banks at an ATM switch.

20. The software of claim 19, wherein the reading of the cells out of the first and second memory banks is executed by a scheduler that is coupled to the first and second memory banks and a Utopia bus.

21. The software of claim 17, further operable to determine which of the first and second memory banks the words, which have accumulated in each of the first and second serial-to-parallel converters, are written to.

22. The software of claim 17, further operable to communicate a write enable signal to a selected one of the first and second memory banks to indicate that one or more of the words, which have accumulated in each of the first and second serial-to-parallel converters, is ready to be written.

23. The software of claim 17, further operable to signal to a multiplexer to communicate one or more of the words, which have accumulated in each of the first and second serial-to-parallel converters, to a selected one of the first and second memory banks.

24. The software of claim 17, further operable to increment an address associated with a selected one of the first and second memory banks each time one of the words, which have accumulated in each of the first and second serial-to-parallel converters, is written to one of the first and second memory banks.

25. An apparatus for communicating data, comprising:

a multiplexer operable to receive first and second sets of data, wherein the first and second sets of data are associated with a first channel and a second channel respectively;

a first write controller associated with the first channel and a second write controller associated with the second channel;

first and second serial-to-parallel converters, the first serial-to-parallel converter coupled to the first write controller and operable to convert the first set of data to a parallel form before the first set of data is received by the first write controller, the second serial-to-parallel converter coupled to the second write controller and operable to convert the second set of data to a parallel form before the second set of data is received by the second write controller;

first and second memory banks each coupled to the multiplexer and each operable to receive from the multiplexer one or more words that have accumulated in each of the serial-to-parallel converters and that comprise a portion of a selected one of the first and second sets of data;

a scheduler coupled to each of the first and second memory banks and operable to monitor the first and second memory banks in order to determine whether the first and second memory banks have accumulated enough words to form a cell, the scheduler operable to read a cell out of a selected one of the first and second memory banks, wherein the cell comprises a plurality of the words; and a select controller coupled to the multiplexer and operable to determine which of the first and second memory banks the words are written to.

* * * * *